Patented Sept. 10, 1946

2,407,585

UNITED STATES PATENT OFFICE 2,407,585

ALKYLATION PROCESS

William A. Stover, Woodbury, N. J., assignor to Socony-Vacuum Oil Company, Incorporated, a corporation of New York No Drawing. Application September 11, 1945, Serial No. 615,695

12 Claims. (Cl. 260—683.4)

This invention relates generally, to the alkylation of paraffinic hydrocarbons with olefinic hydrocarbons, and is more particularly concerned with the production of high-octane motor fuels by the catalytic alkylation of paraffinic hydrocarbons with olefinic hydrocarbons.

It is well known in the art to polymerize olefinic hydrocarbon gases to produce motor fuels having constituents of an unsaturated character. Various commercial processes have been proposed for ultimately effecting the desired polymerization of the olefinic hydrocarbons. These processes have been predicated upon the dictates of the chemical nature of the stocks available, as well as engineering considerations such as initial and operation costs; their essential feature being that in the course of treating the materials, the olefinic hydrocarbons produced in the earlier stages of the process, are eventually polymerized into hydrocarbons boiling within the gasoline boiling range. Accordingly, hydrocarbon gases may be passed along with cracking stock or naphtha through a cracking still to crack and polymerize such gases to gasoline simultaneously with the cracking or reforming, or paraffinic hydrocarbon gases may be separately cracked into olefinic hydrocarbon gases and these gases are subsequently passed with naphtha through a polymerizing and reforming still. In some instances, the processes involve the use of catalysts for facilitating the cracking and/or polymerization operations.

It is also well known in the art to combine paraffinic hydrocarbons directly with olefinic hydrocarbons by processes broadly called alkylation processes, to produce motor fuels having constituents of saturated character. In alkylation processes, a charge comprising a mixture of an alkylatable paraffinic hydrocarbon, called the paraffinic reactant, and an olefinic hydrocarbon, called the olefinic reactant or alkylating agent, is subjected to high temperature and pressure to produce a saturated alkylate product. Since conditions of alkylation also cause polymerization of the olefinic reactant, it is necessary to maintain a relatively low concentration of the olefinic reactant in the charge. The only limit to the pressure used appears to be the feasibility of maintaining high pressures. On the other hand, the temperature used is limited by degradation of the hydrocarbon reactants in the charge to low molecular weight hydrocarbons, and the occurrence of side reactions, including polymerization of the olefinic reactant, under high temperature conditions, that substantially reduce the purity of the product obtained.

The temperatures and to a certain extent, the pressures employed in alkylation operations, depend upon whether the alkylation is effected in the absence or presence of alkylation catalysts. The two methods are generally referred to as thermal and catalytic alkylation, respectively. As is well known in the art, thermal alkylation ordinarily involves the use of temperatures of at least about 950° F. and pressures of the order of 4000 pounds per square inch or higher. At these temperatures, the degradation of the hydrocarbon reactants in the charge, and the occurrence of side reactions, including polymerization of the olefinic reactant, is somewhat marked. On the other hand, catalytic alkylation involves the use of appreciably lower temperatures, thereby assuring a high yield of desired alkylate by avoiding extensive degradation of the reactants, the occurrence of secondary reactions, and appreciable polymerization of the olefinic reactant.

Several methods are known for the catalytic alkylation of isoparaffinic hydrocarbons with olefinic hydrocarbons. For instance, it is known to alkylate isoparaffinic hydrocarbons with olefinic hydrocarbons in the presence of sulfuric acid, phosphoric acid, metal phosphates, metal halides, activated clays, and the like, as catalysts. In these catalytic alkylation processes, the hydrocarbon reactants form with the alkylation catalysts, a heterogeneous system during the alkylation operation. Hence, these alkylation catalysts may be termed heterogeneous alkylation catalysts. Since under alkylation conditions, the catalytic activity of the alkylation catalysts appears to be predicated upon contact between the catalysts and the gaseous hydrocarbon reactants at the interfaces therebetween, in these processes, the catalysts are used in amounts varying between 10 per cent and 200 per cent by weight, on the charge, depending on the catalyst used. Due to these comparatively high amounts, where possible, recovery and regeneration of the catalysts have been proposed. This, of course, involves high initial and operation costs. Further, it is also known that certain substances called promoters, promote the catalytic activity of these alkylation catalysts. Accordingly, several processes have been proposed wherein small amounts of these promoters, on the order of about 1 per cent to 3 per cent by weight on the charge, are added to the catalysts to promote their alkylation catalytic activity.

A copending application, Serial No. 502,018, filed September 11, 1943, is directed to the process of alkylating normal paraffinic or isoparaffinic hydrocarbons with olefinic hydrocarbons, which comprises contacting a normal paraffinic or isoparaffinic hydrocarbon and an olefinic hydrocarbon in a reaction zone under alkylating conditions, with small or promoter amounts of what has been termed therein, a homogeneous gaseous phase alkylation catalyst, which consists essentially of a material that forms with the hydrocarbon reactants, a single, homogeneous, gaseous phase under the alkylation conditions of the reaction zone. The alkylation conditions of the process of this copending application, comprise a broad temperature range of about 590° F. to about 850° F., preferably, about 650° F. to about 825° F., and pressures of at least 500 pounds per square inch gauge, preferably, pressures of at least 1500 pounds per square inch.

Another copending application, Serial No. 502,813, filed September 17, 1943, is directed to the process of alkylating isobutane with propylene, which comprises contacting isobutane and propylene in a reaction zone under closely controlled alkylating conditions, with promoter or small amounts of the homogeneous gaseous phase catalysts broadly disclosed in the copending application referred to hereinbefore, the closely controlled alkylating conditions including a temperature range of about 750° F. to about 850° F., preferably, about 775° F. to about 825° F., and pressures of at least 2500 pounds per square inch gauge. In the alkylation of isobutane with propylene in the presence of homogeneous gaseous phase alkylation catalysts, it was found that the alkylate obtained included constituents that are entirely different from the constituents of the hydrocarbon alkylate obtained in the alkylation of isobutane with propylene in the presence of known heterogeneous alkylation catalysts, i. e., AlCl$_3$, H$_2$SO$_4$, and the like. Thus, when heterogeneous alkylation catalysts are used, 2,3-dimethylpentane and 2,4-dimethylpentane are important constituents of the hydrocarbon alkylate obtained. On the other hand, when homogeneous gaseous phase alkylation catalysts are employed, triptane or 2,2,3-trimethylbutane, 2,2-dimethylpentane, and 2-methylhexane are the predominant constituents of the hydrocarbon alkylate. In this copending application, the formation of these three compounds was postulated as follows:

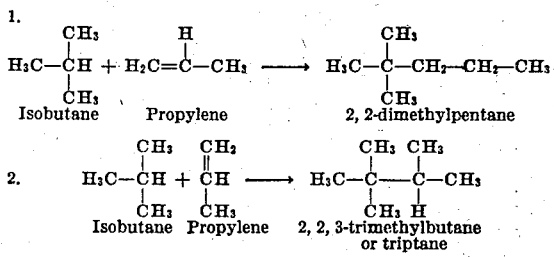

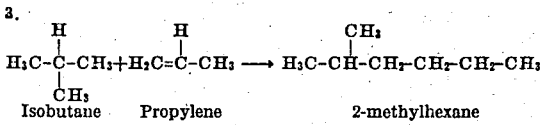

From a motor fuel standpoint, the 2,2-dimethylpentane produced by the first reaction has an octane number of about 93 CFR motor method; the triptane produced by the second reaction has an octane number of well over 100; and the 2-methylhexane obtained in the third reaction has an octane number of about 45. In view of the foregoing, in the manufacture of high-octane motor fuels by the alkylation of isobutane with propylene, alkylation conditions that favor the production of triptane obviously are preferable. It was also found that in actual practice, it was impossible to obtain triptane exclusively, appreciable amounts of 2,2-dimethylpentane and 2-methylhexane being always formed.

The specific classes of homogeneous gaseous phase catalysts disclosed in these copending applications are organic halogen compounds, and, more particularly, chlorine and bromine derivatives of acyclic hydrocarbons. Chloroform, chlorinated naphtha, chlorinated butane, carbon tetrachloride, ethylene dibromide, propylene dibromide, dibromisobutane, ethyl bromide, propylene tribromide, and tertiary monobromobutane are among the specific chlorine and bromine derivatives of acyclic hydrocarbons mentioned as suitable homogeneous, gaseous phase alkylation catalysts for the alkylation processes disclosed in these copending applications.

The present invention is predicated on the use of mixtures of carbon dioxide and water as homogeneous gaseous phase alkylation catalysts, in the alkylation of paraffinic hydrocarbons with olefinic hydrocarbons, under conditions of alkylation.

Accordingly, it is an object of the present invention to provide an efficient process for alkylating alkylatable isoparaffinic or alkylatable normal paraffinic hydrocarbons with olefinic hydrocarbons. Another object is to provide an improved process for catalytically alkylating either alkylatable normal paraffinic hydrocarbons or alkylatable isoparaffinic hydrocarbons with olefinic hydrocarbons. A more specific object is to provide a process for catalytically alkylating alkylatable normally gaseous isoparaffinic hydrocarbons with normally gaseous olefinic hydrocarbons, to produce high yields of high-octane gasoline. A very important object is to afford a process for alkylating isobutane with propylene, to produce high yields of high-octane gasoline. A further object is to provide a process capable of carrying out the above objects by using mixtures of carbon dioxide and water as homogeneous gaseous phase alkylation catalysts. Other objects and advantages of the present invention will become apparent to those skilled in the art from the following description.

Broadly stated, my invention provides a process for alkylating alkylatable normal paraffinic or isoparaffinic hydrocarbons, particularly isobutane, with olefinic hydrocarbons, particularly propylene and ethylene, which comprises contacting the paraffinic and olefinic hydrocarbons in gaseous phase and in a reaction zone under alkylating conditions, with mixtures of carbon dioxide and water.

An important feature is the relatively low temperature that may be used. As a result, degradation of the hydrocarbon reactants in the charge to low molecular weight hydrocarbons and the pronounced occurrence of side reactions, including polymerization of the olefinic hydrocarbons, are substantially completely avoided. Consequently, in my process, I obtain high yields of a high grade product that is almost entirely paraffinic in nature and is substantially free from impurities.

A very important feature of the present invention is the fact that, contrary to known catalytic alkylation processes of the prior art in which the hydrocarbon reactants being processed form with the alkylation catalysts, a heterogeneous system during the alkylation operation, the alkylation process of my invention, employs alkylation catalysts consisting essentially of materials that form with the hydrocarbon reactants being processed, a single, homogeneous gaseous phase under alkylating conditions. The alkylation catalysts of the present invention are called, therefore and as noted hereinbefore, homogeneous gaseous phase alkylation catalysts, in contradistinction to the alkylation catalysts of the prior art which are referred to as heterogeneous alkylation catalysts. Accordingly, as a result of the catalyst's being in the same phase or state as the hydrocarbon reactants being processed, fouling of the catalyst is substantially eliminated and agitation and/or mixing problems are non-extant. Further, since the catalytic activity of alkylation catalysts appears to be predicated somewhat upon contact between the catalysts and the hydrocarbon reactants at the interfaces therebetween, it follows that the catalytic efficiency of a given catalyst increases with the increase in area of interfacial contact, other variables remaining constant. Hence, since the homogeneous gaseous phase alkylation catalysts of my process inherently furnish the greatest possible "interfacial contact" between the catalyst and the hydrocarbon reactants under the conditions of alkylation, efficient catalytic activity with a concomitant high yield of high grade alkylate is possible although using relatively small amounts of homogeneous gaseous phase alkylation catalyst.

In view of the foregoing, an operation feature of the process of the present invention that is of considerable practical importance, is that relatively small amounts of carbon dioxide and water may be used as alkylation catalysts. These amounts are so small and the materials are so cheap that they may be discarded feasibly, thereby obviating recovery and regeneration problems and eliminating high initial and operation costs.

The amounts of carbon dioxide and water used in my process may vary between about 3 per cent by weight and 50 per cent by weight, and between about 3 per cent by weight and 50 per cent by weight, respectively, and preferably, between about 5 per cent by weight and 20 per cent by weight, and about 5 per cent by weight and about 20 per cent by weight, respectively, with respect to total charge of hydrocarbon reactants. It must be noted, however, that larger amounts of each may be employed if desired, although no additional advantages seem to result therefrom.

The paraffinic and olefinic hydrocarbons to be used in my process may be derived from any suitable source, as is well known in the art, and may be used either in the pure state or in admixture with other constituents not undesirable. The paraffinic and olefinic hydrocarbons usually employed in the preferred operation of manufacturing motor fuels, will be the normally gaseous paraffinic hydrocarbons, except methane and ethane, and the normally gaseous olefinic hydrocarbons, as is well understood in the art. Here again this process has a distinct advantage over many of the prior art processes, in that the olefin ethylene may be used for alkylating the alkylatable paraffinic hydrocarbons. It is well known that ethylene cannot be used in many catalytic processes, including the sulfuric acid process, whereby the supply of available olefinic hydrocarbons is restricted. Therefore, an important aspect of the present invention is the fact that isobutane, for instance, may be alkylated with ethylene.

A conventional and preferred source of paraffinic and olefinic hydrocarbons is the fixed gases obtained around petroleum refineries. These fixed gases may furnish substantially all the desired paraffinic and olefinic hydrocarbons, or it may be necessary or desirable to obtain additional supplies, as is well understood. Additional olefinic hydrocarbons, if required, may be formed from a portion of the paraffinic hydrocarbons. On the other hand, additional paraffinic hydrocarbons may be admixed to increase the concentration of paraffinic hydrocarbons to a desired magnitude.

In carrying out my process, I use temperatures varying between about 590° F. and about 850° F., and preferably temperatures varying between about 650° F. and about 825° F. In the alkylation of isobutane with propylene, however, it was found, as disclosed in copending application Serial No. 502,813, filed September 17, 1943, that the best yields of desired alkylate are obtained when the alkylation is conducted at temperatures falling within about 750° F. to about 850° F., and preferably within about 775° F. to about 825° F. The alkylate produced under these conditions contains no more than 5 per cent of olefinic hydrocarbons and no aromatics so that the predominance of alkylation obtained thereby is a distinct feature of the process. Under appreciable higher temperature conditions, secondary reactions occur that substantially reduce the purity of the product obtained. In the alkylation of isobutane with propylene in accordance with the process of the present invention, it must be noted that even within the preferred temperature range, side reactions occur that account for substantial portions of the total alkylate.

The pressure to be used in my process may vary from about 500 pounds per square inch to about 6000 pounds per square inch or more, and preferably from about 2500 pounds per square inch to about 6000 pounds per square inch, the most suitable pressure being more or less dependent upon the particular temperature involved. In general, the higher the pressure, the higher the yield of alkylate. Accordingly, the criterion for establishing an upper limit to the pressure range used is primarily the feasibility of maintaining such pressure.

The process may be carried out as a batch, continuous or semi-continuous type of operation. Particularly when the process is carried out on a commercial scale, economic considerations make it preferable to operate in a continuous manner. For efficient operation, whether the process is carried out on a batch or continuous basis, it is essential that the hydrocarbon reactants be intimately contacted with the homogeneous gaseous phase catalysts of my invention. This may be effected in several ways, as is well known in the art.

In my process it is desirable, as in known iso-paraffin-olefin alkylation processes, to keep the concentration of the olefinic hydrocarbons relatively low during the alkylation reaction, in order to eliminate as much olefin polymerization as possible. Accordingly, it is advisable to maintain the olefin concentration in the charge below about 25 per cent by volume, and preferably between about 5 per cent and about 12 per cent by volume. In continuous operation, this is effected by introducing the olefinic reactant at a number of points in the reaction zone or by adding the olefinic reactant to a recirculating mass of excess paraffinic hydrocarbon reactant, reaction product, and catalyst.

The reaction period during which the reactants are present in the reaction zone, depends upon the temperature, and to a certain extent, upon the pressure. Ordinarily, a reaction period varying between 1-2 minutes and 1-2 hours is satisfactory.

It must be understood, that the reaction variables are more or less interdependent, hence, when one is arbitrarily fixed, the limits within which the others may be varied, are somewhat restricted. In any particular instance, the most desirable conditions can be readily ascertained by one skilled in the art, the preferred ranges of these variables having been indicated hereinbefore.

The alkylate product that I obtain distills over a fairly large boiling range, but a greater part of the alkylate, usually from about 85 per cent to about 90 per cent, distills in the boiling range of aviation gasolines. The iodine number of the aviation distillate is low, on the order of about 5 to 10. As mentioned hereinbefore, the alkylate product consists predominantly of branched paraffinic hydrocarbons.

Numerous experimental data could be adduced to indicate the results obtainable by employing the homogeneous gaseous phase catalysts of the present invention, but the following examples are sufficiently characteristic:

TABLE I

*Alkylation of isobutane with ethylene to produce neohexane*

Continuous operation

| | Run No. 1 | Run No. 2 |
|---|---|---|
| Temperature, °F | 855 | 855 |
| Pressure, lbs. per sq. in | 2,500 | 2,500 |
| Contact time, minutes | 10.4 | 10.0 |
| Carbon dioxide, per cent by weight of hydrocarbon charge | 0 | 4.6 |
| Water, per cent by weight of hydrocarbon charge | 0 | 12.2 |
| Ethylene, per cent by weight of hydrocarbon charge | 5.4 | 5.2 |
| Volume per cent of alkylate boiling between 44° C. and 54° C | 36.5 | 50.6 |
| Weight per cent of neohexane in 44-54° C. cut of alkylate | 95+ | 95+ |

TABLE II

*Alkylation of isobutane with propylene to produce triptane*

Continuous operation

| | Run No. 1 | Run No. 2 |
|---|---|---|
| Temperature, °F | 800 | 805 |
| Pressure, lbs. per sq. in | 4,500 | 4,500 |
| Contact time, minutes | 15.3 | 16.8 |
| Carbon dioxide, per cent by weight of hydrocarbon charge | 0 | 7.0 |
| Water, per cent by weight of hydrocarbon charge | 0 | 11.5 |
| Propylene, per cent by weight of hydrocarbon charge | 10.3 | 10.1 |
| Volume per cent of alkylate boiling between 76° C. and 86° C | 21.5 | 48.0 |
| Volume per cent triptane in 76-86° C. cut of alkylate | 11 | 6 |

This application is a continuation-in-part of my copending application Serial No. 523,727, filed February 24, 1944.

The present invention may be embodied in other specific forms without departing from the spirit or essential attributes thereof, and it is therefore desired that the present embodiments be considered in all respects as illustrative and not restrictive, reference being had to the appended claims rather than to the foregoing description to indicate the scope of the invention.

I claim:

1. The process of alkylating alkylatable paraffinic hydrocarbons with olefinic hydrocarbons, which comprises contacting an alkylatable paraffinic hydrocarbon with an olefinic hydrocarbon, in gaseous phase and in a reaction zone under alkylating conditions, in the presence of a mixture of carbon dioxide and water, and maintaining said alkylatable paraffinic hydrocarbon in excess over said olefinic hydrocarbon in said reaction zone, so that alkylation is the principal reaction.

2. The process of manufacturing a high-octane motor fuel, which comprises contacting an alkylatable normally gaseous paraffinic hydrocarbon with a normally gaseous olefinic hydrocarbon, in gaseous phase and in a reaction zone under alkylating conditions, in the presence of a mixture of carbon dioxide and water, and maintaining said alkylatable normally gaseous paraffinic hydrocarbon in excess over said normally gaseous olefinic hydrocarbon in said reaction zone, so that alkylation is the principal reaction.

3. The process of manufacturing a high-octane motor fuel, which comprises contacting isobutane with propylene, in gaseous phase and in a reaction zone under alkylating conditions, in the presence of a mixture of carbon dioxide and water, and maintaining said isobutane in excess over said propylene in said reaction zone, so that alkylation is the principal reaction.

4. The process of manufacturing a high-octane motor fuel, which comprises contacting isobutane with ethylene, in gaseous phase and in a reaction zone under alkylating conditions, in the presence of a mixture of carbon dioxide and water, and maintaining said isobutane in excess over said ethylene in said reaction zone, so that alkylation is the principal reaction.

5. The process of alkylating alkylatable paraffinic hydrocarbons with olefinic hydrocarbons, which comprises contacting an alkylatable paraffinic hydrocarbon with an olefinic hydrocarbon, in gaseous phase and in a reaction zone under alkylating conditions including a temperature varying between about 590° F. and about 850° F. and a pressure of at least 500 pounds per square inch, in the presence of a mixture of carbon dioxide and water, said carbon dioxide and said water each being present in amounts varying between about 3 per cent and about 50 per cent by weight based on the hydrocarbon charge, and maintaining said alkylatable paraffinic hydrocarbon in excess over said olefinic hydrocarbon in said reaction zone, so that alkylation is the principal reaction.

6. The process of manufacturing a high-octane motor fuel, which comprises contacting an alkylatable normally gaseous isoparaffinic hydrocarbon with a normally gaseous olefinic hydrocarbon, in gaseous phase and in a reaction zone under alkylating conditions including a temperature varying between about 590° F. and about 850° F. and a pressure of at least 500 pounds per square inch, in the presence of a mixture of carbon dioxide and water, said carbon dioxide and said water each being present in amounts varying between about 3 per cent and about 50 per cent by weight based on the hydrocarbon charge, and maintaining said alkylatable normally gaseous isoparaffinic hydrocarbon in excess over said normally gaseous olefinic hydrocarbon in said reaction zone, so that alkylation is the principal reaction.

7. The process of manufacturing a high-octane motor fuel, which comprises contacting isobutane with ethylene, in gaseous phase and in a reaction zone under alkylating conditions including a temperature varying between about 590° F. and about 850° F. and a pressure of at least 500 pounds per square inch, in the presence of a mixture of carbon dioxide and water, said carbon dioxide and said water each being present in amounts varying between about 3 per cent and about 50 per cent by weight based on the hydrocarbon charge, and maintaining said isobutane in excess over said ethylene in said reaction zone, so that alkylation is the principal reaction.

8. The process of manufacturing a high-octane motor fuel, which comprises contacting isobutane with propylene, in gaseous phase and in a reaction zone under alkylating conditions including a temperature varying between about 750° F. and about 850° F. and a pressure of at least 2500 pounds per square inch, in the presence of a mixture of carbon dioxide and water, said carbon dioxide and said water each being present in amounts varying between about 3 per cent and about 50 per cent by weight based on the hydrocarbon charge, and maintaining said isobutane in excess over said propylene in said reaction zone, so that alkylation is the principal reaction.

9. The process of alkylating alkylatable isoparaffinic hydrocarbons with olefinic hydrocarbons, which comprises contacting an alkylatable isoparaffinic hydrocarbon with an olefinic hydrocarbon, in gaseous phase and in a reaction zone under alkylating conditions including a temperature varying between about 650° F. and about 825° F. and a pressure of at least 1500 pounds per square inch, in the presence of a mixture of carbon dioxide and water, said carbon dioxide and said water each being present in amounts varying between about 5 per cent and about 20 per cent by weight based on the hydrocarbon charge, and maintaining said alkylatable isoparaffinic hydrocarbon in excess over said olefinic hydrocarbon in said reaction zone, so that alkylation is the principal reaction.

10. The process of manufacturing a high-octane motor fuel, which comprises contacting an alkylatable normally gaseous isoparaffinic hydrocarbon with a normally gaseous olefinic hydrocarbon, in gaseous phase and in a reaction zone under alkylating conditions including a temperature varying between about 650° F. and about 825° F. and a pressure of at least 1500 pounds per square inch, in the presence of a mixture of carbon dioxide and water, said carbon dioxide and said water each being present in amounts varying between about 5 per cent and about 20 per cent by weight based on the hydrocarbon charge, and maintaining said alkylatable normally gaseous isoparaffinic hydrocarbon in excess over said normally gaseous olefinic hydrocarbon in said reaction zone, so that alkylation is the principal reaction.

11. The process of manufacturing neohexane, which comprises contacting isobutane with ethylene, in gaseous phase and in a reaction zone under alkylating conditions including a temperature varying between about 650° F. and about 825° F. and a pressure of at least 1500 pounds per square inch, in the presence of a mixture of carbon dioxide and water, said carbon dioxide and said water each being present in amounts varying between about 5 per cent and about 20 per cent by weight based on the hydrocarbon charge, and maintaining isobutane in excess over said ethylene in said reaction zone, so that alkylation is the principal reaction.

12. The process of manufacturing triptane, which comprises contacting isobutane with propylene, in gaseous phase and in a reaction zone under alkylating conditions including a temperature varying between about 775° F. and about 825° F. and a pressure of at least 2500 pounds per square inch, in the presence of a mixture of carbon dioxide and water, said carbon dioxide and said water each being present in amounts varying between about 5 per cent and about 20 per cent by weight based on the hydrocarbon charge, and maintaining isobutane in excess over said propylene in said reaction zone, so that alkylation is the principal reaction.

WILLIAM A. STOVER.